(12) United States Patent
Ito

(10) Patent No.: US 9,994,304 B2
(45) Date of Patent: Jun. 12, 2018

(54) HYDRAULIC ACTUATOR

(71) Applicant: NABTESCO CORPORATION, Tokyo (JP)

(72) Inventor: Koji Ito, Gifu-ken (JP)

(73) Assignee: NABTESCO CORPORATION, Tokyo (JP)

( * ) Notice: Subject to any disclaimer, the term of this patent is extended or adjusted under 35 U.S.C. 154(b) by 330 days.

(21) Appl. No.: 14/872,406

(22) Filed: Oct. 1, 2015

(65) Prior Publication Data

US 2016/0096617 A1    Apr. 7, 2016

(30) Foreign Application Priority Data

Oct. 1, 2014    (JP) ................... 2014-202914
Nov. 28, 2014    (JP) ................... 2014-242380

(51) Int. Cl.
| | |
|---|---|
| *B64C 9/12* | (2006.01) |
| *F15B 15/22* | (2006.01) |
| *B64C 13/40* | (2006.01) |
| *F15B 15/16* | (2006.01) |
| *F15B 15/20* | (2006.01) |
| *B64C 9/32* | (2006.01) |

(52) U.S. Cl.
CPC .............. *B64C 13/40* (2013.01); *B64C 9/323* (2013.01); *F15B 15/16* (2013.01); *F15B 15/204* (2013.01)

(58) Field of Classification Search
CPC ........ B64C 9/323; F15B 15/204; F15B 15/16; F15B 15/1466; F15B 15/227; F15B 15/24; F15B 11/028; F15B 11/0413

USPC ......... 91/394, 405, 519, 159, 162, 165, 166, 91/169, 172; 92/85 R, 85 B, 166, 165 R; 244/78.1, 99.2, 99.5, 99.6, 99.9
See application file for complete search history.

(56) References Cited

U.S. PATENT DOCUMENTS

| | | | | |
|---|---|---|---|---|
| 4,720,066 A | * | 1/1988 | Renken ...................... | B64C 9/12 244/213 |
| 4,784,355 A | * | 11/1988 | Brine ......................... | B64C 9/16 244/213 |
| 2011/0006156 A1 | * | 1/2011 | Heeren .................. | F15B 15/223 244/99.5 |
| 2012/0292452 A1 | * | 11/2012 | Parker ....................... | B64C 9/16 244/203 |

FOREIGN PATENT DOCUMENTS

JP    2008-529871 A    8/2008

* cited by examiner

*Primary Examiner* — Thomas E Lazo
*Assistant Examiner* — Dustin T Nguyen
(74) *Attorney, Agent, or Firm* — Pillsbury Winthrop Shaw Pittman, LLP

(57) ABSTRACT

A hydraulic actuator is adapted to drive a spoiler of a wing having a flap. When the hydraulic actuator drives the spoiler in an overlapping region where a driving range of the flap and a driving range of the spoiler overlap, an output suppressing structure suppress a drive output of the hydraulic actuator in the overlapping region to be less than that in a non-overlapping region other than the overlapping region.

18 Claims, 8 Drawing Sheets

HYDRAULIC ACTUATOR

CROSS-REFERENCE TO RELATED APPLICATIONS

This application is based upon and claims the benefit of priority from prior Japanese Patent Application Nos. 2014-202914, filed on Oct. 1, 2014, and 2014-242380, filed on Nov. 28, 2014, the entire contents of which are incorporated herein by reference.

FIELD

The present invention relates to a hydraulic actuator which drives a spoiler on an aircraft wing.

BACKGROUND

Conventionally, a spoiler on an aircraft wing is driven by a spoiler driving mechanism that includes a hydraulic actuator (refer to, for example, Japanese National Phase Patent Publication No. 2008-529871). FIG. 5 shows an example of a spoiler driving mechanism, and shows a state of a flap 102 and a spoiler 104 on a wing 100 when the aircraft is cruising by solid lines. The positions of the flap 102 and the spoiler 104 shown by the solid lines may be referred to as neutral positions.

A hydraulic actuator 106 of the spoiler driving mechanism is coupled to the spoiler 104. The spoiler 104 rises and falls based on a reciprocating movement of a piston rod 108 of the hydraulic actuator 106. When the flap 102 and the spoiler 104 are deployed into a high lift configuration, as shown by the alternate long and two short dashed lines, the flap 102 is caused to fall from the neutral position by an unillustrated actuator, and the spoiler 104 is caused to fall from the neutral position by the hydraulic actuator 106. The spoiler 104 partially occupies a gap G defined between the wing 100 and the flap 102.

When reducing aircraft speed, the spoiler 104 is raised from the neutral position by the hydraulic actuator 106 as shown by the broken lines in FIG. 5. The spoiler 104 thereby serves as air resistance to reduce aircraft speed.

The spoiler 104 thus rises and falls in a driving range DS from the position shown by the long and two short dashed lines to the position of the broken lines, while the flap 102 rises and falls in a driving range DF from the position shown by the long and two short dashed lines to the neutral position, so that an overlapping region R is created in which the driving range DS of the spoiler 104 and the driving range DF of the flap 102 overlap.

SUMMARY

In the spoiler driving mechanism of FIG. 5, the flap 102 and the spoiler 104 interfere with each other when the hydraulic actuator 106 has stopped driving for the reason such that electrical power is lost with the spoiler 104 located in the overlapping region R. For example, the spoiler 104 presses down the flap 102 as a result of the spoiler 104 falling due to its own weight when the hydraulic actuator 106 has stopped driving for the reason such that electrical power is lost when the spoiler 104 is at the neutral position. In order to solve this problem, the spoiler driving mechanism in FIG. 5 is provided with a release valve (not shown) that is configured to, when the flap 102 and the spoiler 104 interfere with each other, relieve hydraulic pressure being applied to the spoiler 104 from the hydraulic actuator 106 so that the spoiler 104 is allowed to return to the neutral position.

Although the provision of the release valve reduces a pressing force applied from the spoiler 104 to the flap 102, but it is not able to suppress the flap 102 and the spoiler 104 from interfering with each other. Furthermore, the provision of the release valve increases the number of components of the spoiler driving mechanism and complicates and enlarges a hydraulic circuit of the spoiler driving mechanism.

It is an object of the present invention to provide a hydraulic actuator capable of suppressing an increase in size of the spoiler driving mechanism.

A first aspect of the present invention is a hydraulic actuator adapted to drive a spoiler of a wing having a flap, the hydraulic actuator comprising an output suppressing structure configured to, when the hydraulic actuator drives the spoiler in an overlapping region where a driving range of the flap and a driving range of the spoiler overlap, suppress a first drive output which is a drive output of the hydraulic actuator in the overlapping region to be less than a second drive output which is a drive output of the hydraulic actuator in a non-overlapping region other than the overlapping region.

According to the actuator of the first aspect, a force by which the spoiler moves toward the flap in the overlapping region is reduced by the output suppressing structure. Therefore, for example, even if the spoiler moves toward the flap as a result of electrical power being lost and the spoiler contacts the flap in the overlapping region, the spoiler is suppressed from pressing the flap by an excessive force. Thus, because such a release valve as in the spoiler driving mechanism in FIG. 5 is unnecessary, an increase in size of the spoiler driving mechanism can be suppressed.

In some implementations, the output suppressing structure is configured to utilize hydraulic pressure to suppress the first drive output to be less than the second drive output.

According to the structure, for example, by using a hydraulic pressure in the hydraulic actuator, the output suppressing structure can be downsized as compared with, for example, a structure of suppressing a drive output of the hydraulic actuator by a spring as an output suppressing structure. The structure which utilizes hydraulic pressure to suppress the first drive output less than the second drive output is not limited to using a hydraulic pressure in the hydraulic actuator.

In some implementations, the hydraulic actuator further comprises a piston rod directly or indirectly coupled to the spoiler. The output suppressing structure is configured to utilize a hydraulic pressure that drives the piston rod to suppress the first drive output to be less than the second drive output.

According to the structure, because the output suppressing structure uses a hydraulic pressure in the hydraulic actuator, as compared with when the output suppressing structure uses a hydraulic pressure of a hydraulic circuit outside of the hydraulic actuator, oil passages can be shortened. Thus, the output suppressing structure can be downsized.

In some implementations, the piston rod includes a piston configured to partition a first hydraulic chamber and a second hydraulic chamber. The output suppressing structure includes a resistance piston that is arranged in the second hydraulic chamber and is movable with respect to the piston rod, and a stopper that contacts the resistance piston to restrict movement of the piston rod when the piston rod moves so as to contract the first hydraulic chamber in the overlapping region.

According to the structure, because the resistance piston generates resistance against a movement of the piston rod and movement of the piston rod is limited, the first drive output of the hydraulic actuator becomes less than the second drive output. Also, by employing such a structure, a hydraulic circuit for the output suppressing structure no longer becomes necessary for the hydraulic actuator, and an increase in size of the hydraulic actuator can be suppressed.

In some implementations, the resistance piston and the stopper are adjustable in relative position therebetween.

According to the structure, because the resistance piston and the stopper are adjustable in position, a position where the first drive output of the hydraulic actuator becomes less than the second drive output, that is, a position to reduce a force by which the spoiler presses the flap in the overlapping region can be adjusted to an appropriate position.

A second aspect of the present invention is a hydraulic actuator adapted to drive a spoiler of an aircraft wing having a flap, the spoiler being movable in a spoiler driving range, the flap being movable in a flap driving range, and the spoiler driving range including an overlapping region where the spoiler driving range and the flap driving range overlap, the spoiler taking a neutral position when the aircraft cruises. The hydraulic actuator includes a piston rod configured to transmit a drive output of the hydraulic actuator to the spoiler; and a movement limiting structure configured to limit a movement of the piston rod in a direction in which the spoiler approaches the flap when the spoiler is located in the overlapping region and when the spoiler takes the neutral position.

According to the structure, even if the spoiler attempts to move toward the flap due to its own weight, for example, as a result of aircraft power being lost when the spoiler is located in the driving range, because movement of the piston rod is limited by the movement limiting structure, the spoiler is prevented from moving in the direction to approach the flap in the overlapping region. The spoiler and the flap thus become unlikely to interfere with each other. Also, even if the spoiler attempts to move toward the flap due to its own weight when the spoiler takes the neutral position, by the spoiler being prevented from moving in the direction to approach the flap, the spoiler is suppressed from entering the overlapping region. The spoiler and the flap thus do not interfere with each other.

In some implementations, the hydraulic actuator further includes a housing and a piston of the piston rod accommodated in the housing. The piston partitions the housing into a first hydraulic chamber that produces a hydraulic pressure for lowering the spoiler and a second hydraulic chamber that produces a hydraulic pressure for raising the spoiler. The movement limiting structure includes a stopper piston that is arranged in the housing and partitions between the second hydraulic chamber and a third hydraulic chamber in the housing, and limits movement of the piston rod based on a relationship of a force that the stopper piston receives from hydraulic pressure of the third hydraulic chamber when the first hydraulic chamber and the third hydraulic chamber communicate with each other via a valve device and a force that the piston receives from hydraulic pressure of the first hydraulic chamber. The stopper piston has an area receiving hydraulic pressure of the third hydraulic chamber that is larger than an area of the piston receiving hydraulic pressure of the first hydraulic chamber.

According to the structure, when the valve device makes the first hydraulic chamber and the third hydraulic chamber communicate with each other, even if the piston presses the stopper piston when, for example, hydraulic pressure of the first hydraulic chamber and hydraulic pressure of the third hydraulic chamber have become almost equal to each other, a force by which the piston presses the stopper piston does not become greater than a force by which the stopper piston presses the piston. Thus, the spoiler is suppressed from approaching the flap.

In some implementations, the piston is configured to contact a radially outer part of the stopper piston when the piston moves in a moving direction of the piston.

In some implementations, the hydraulic actuator further includes a restricting portion configured to contact a radially inner part of the stopper piston other than a radially outer part of the stopper piston when the stopper piston moves in a moving direction of the stopper piston to restrict a movement of the stopper piston in a direction in which the stopper piston expands the third hydraulic chamber.

In some implementations, the hydraulic actuator further includes a restricting portion configured to restrict a movement of the stopper piston in a direction in which the stopper piston expands the third hydraulic chamber. The stopper piston includes a tabular base portion configured to contact with the restricting portion and a guide portion extending from the base portion in a moving direction of the stopper piston to guide a movement of the stopper piston in the moving direction of the stopper piston. A distal end surface of the guide portion is located at a second hydraulic chamber side further than an end surface of the restricting portion facing toward the third hydraulic chamber when the base portion contacts the restricting portion.

In some implementations, the restricting portion includes a second hydraulic chamber side surface and a third hydraulic chamber side surface, and the distal end surface of the guide portion is located between the second hydraulic chamber side surface and the third hydraulic chamber side surface of the restricting portion when the base portion contacts the restricting portion.

An aspect of the present invention is a hydraulic actuator adapted to drive a spoiler of a wing having a flap, the spoiler being movable in a spoiler driving range, the flap being movable in a flap driving range, and the spoiler driving range including an overlapping region where the spoiler driving range and the flap driving range overlap. The hydraulic actuator includes a housing having a housing bore, a first piston member coupled to the spoiler and axially movable in the housing bore to drive the spoiler, and a second piston member coupled to the housing and the first piston member. The second piston member is configured to interact with the first piston to prevent the flap from interfering with or pressing down the flap when the spoiler droops down in the overlapping region.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DESCRIPTION OF THE EMBODIMENTS

Figure 1:
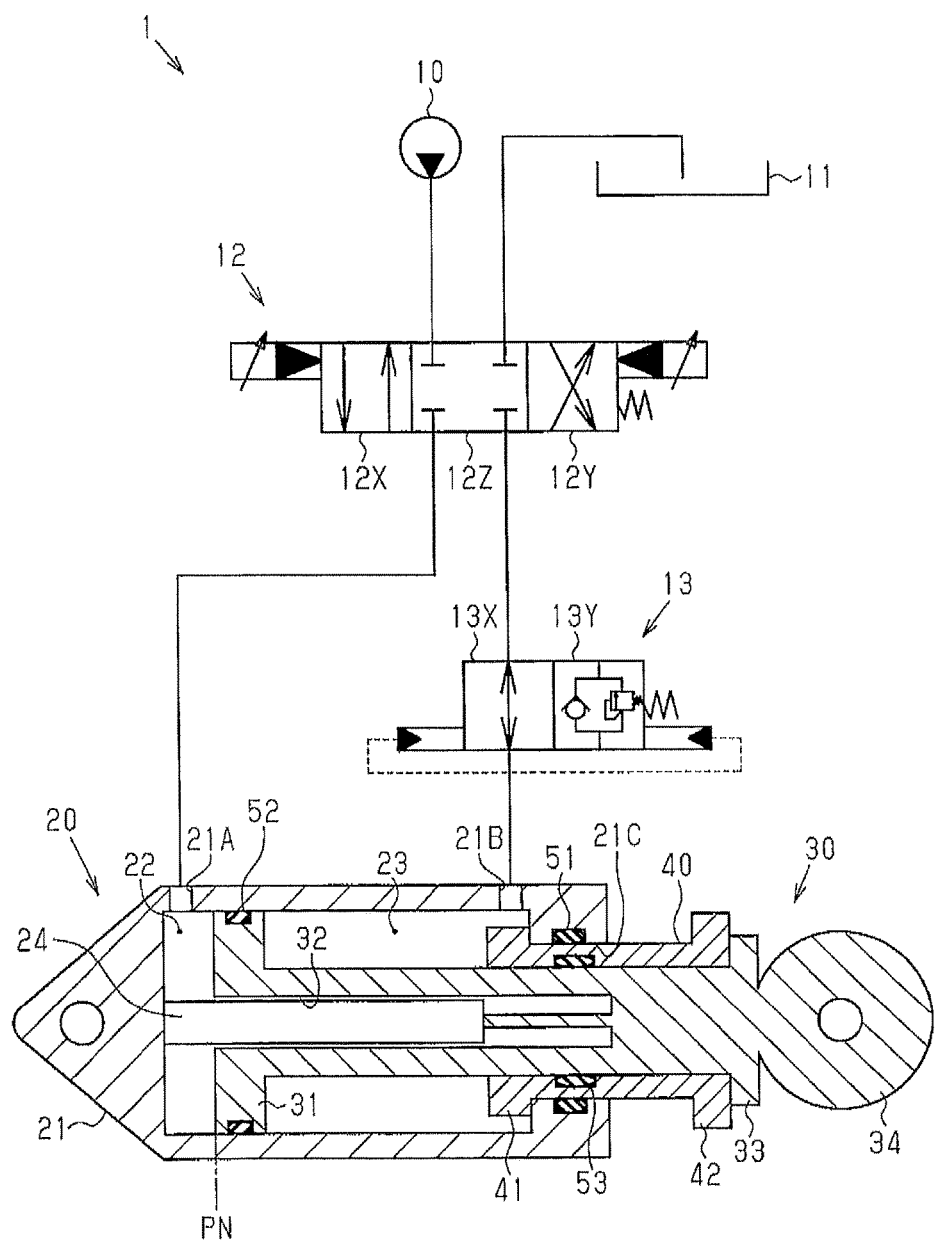
FIG. 1 is a schematic view of a spoiler driving mechanism including a hydraulic actuator of a first embodiment.

Referring to FIG. 1, a spoiler driving mechanism 1 according to a first embodiment will be described. The spoiler driving mechanism 1 is configured to drive a spoiler on an aircraft wing. Hereinafter, FIG. 5 will be sometimes referred to for the sake of convenience in the description of a wing, a spoiler, and a flap.

The spoiler driving mechanism 1 includes a hydraulic actuator 20 configured to drive a spoiler 104, a hydraulic oil source 10 configured to supply oil to the hydraulic actuator 20, and a reservoir 11 configured to reserve oil discharged from the hydraulic actuator 20. The hydraulic actuator 20, the hydraulic oil source 10, and the reservoir 11 are connected by oil passages. Between the hydraulic actuator 20 and the hydraulic oil source 10 and the reservoir 11, a control valve 12 and a hydraulic valve 13 are provided to control oil flow.

The hydraulic actuator 20 includes a housing 21 which includes a cylindrical bore. The cylindrical bore of the housing 21 is partitioned into a first hydraulic chamber 22 and a second hydraulic chamber 23 by a piston 31 of a piston rod 30 coupled to the spoiler 104.

The control valve 12 is, for example, a solenoid valve, and connected to the hydraulic oil source 10, the reservoir 11, the hydraulic valve 13, and the first hydraulic chamber 22 of the hydraulic actuator 20. The control valve 12 is switchable to a first communication position 12X to supply oil to the first hydraulic chamber 22 and discharge oil from the second hydraulic chamber 23, a second communication position 12Y to discharge oil from the first hydraulic chamber 22 and supply oil to the second hydraulic chamber 23, and a shut-off position 12Z to shut off the supply of oil to the respective hydraulic chambers 22 and 23 and shut off the discharge of oil to the respective hydraulic chambers 22 and 23. The control valve 12 takes the second communication position 12Y when it is not supplied with electrical power.

The hydraulic valve 13 is, for example, a solenoid valve, and connected to the control valve 12 and the second hydraulic chamber 23. The hydraulic valve 13 is switchable to a communication position 13X to communicate the second hydraulic chamber 23 with the control valve 12 and a shut-off position 13Y to shut off the communication between the second hydraulic chamber 23 and the control valve 12. The hydraulic valve 13, at the shut-off position 13Y, has a relief function of discharging oil to the control valve 12 when the second hydraulic chamber 23 reaches a hydraulic pressure of a predetermined value or more.

The hydraulic actuator 20 will be described in detail. FIG. 1 shows a state of the hydraulic actuator 20 in the case of a position of the spoiler 104 when an aircraft is cruising (hereinafter, a neutral position). The position of the piston 31 in FIG. 1 may be referred to as a neutral position PN.

The housing 21 includes a first port 21A, a second port 21B, and an insertion hole 21C. The first port 21A is configured to communicate the first hydraulic chamber 22 with an oil passage connected to the control valve 12. The second port 21B is configured to communicate the second hydraulic chamber 23 with an oil passage connected to the hydraulic valve 13. The insertion hole 21C is configured to receive the piston rod 30. A sealing member 51 is attached to an inner peripheral wall defining the insertion hole 21C. The sealing member 51 may be an elastic member such as an O-ring. A position sensor 24 that detects a position of the piston rod 30 is positioned in the first hydraulic chamber 22. The position sensor 24 may be arranged outside of the housing 21.

The piston 31 of t partitions between the first hydraulic chamber 22 and the second hydraulic chamber 23. The piston rod 30 includes a hollow portion 32 having a shape to accommodate a part of the position sensor 24. A sealing member 52 is attached to an outer periphery of the piston 31. The sealing member 52 may be an elastic member such as an O-ring. The piston rod 30 includes a rod stopper 33 and an output portion 34, which are projecting from the housing 21. The rod stopper 33 restricts movement of the piston rod 30. The output portion 34 is coupled to the spoiler 104 to drive the spoiler 104. The rod stopper 33 is an example of a stopper of an output suppressing structure.

A circular cylindrical resistance piston 40 is fitted to the piston rod 30 and the insertion hole 21C of the housing 21 in a state in which the resistance piston 40 is movable with respect to the piston rod 30 and the housing 21. The resistance piston 40 includes a first stopper 41 that is arranged inside of the second hydraulic chamber 23 and restricts movement of the resistance piston 40 and a second stopper 42 that is arranged outside of the housing 21 and restricts movement of the resistance piston 40 outside of the housing 21. The respective stoppers 41 and 42 are formed in circular ring shapes that outwardly project from ends of the circular cylindrical portion of the resistance piston 40. The respective stoppers 41 and 42 have outer diameters larger than an inner diameter of the insertion hole 21C of the housing 21. A sealing member 53 is attached to the inner periphery of the resistance piston 40. The sealing member 53 may be an elastic member such as an O-ring. The resistance piston 40 alone or in combination with the piston rod 30 serves as the output suppressing structure. The resistance piston 40 may be referred to as a tubular member.

As shown in FIG. 1, when the piston 31 is at the neutral position PN, the first stopper 41 of the resistance piston 40 contacts a peripheral edge of the insertion hole 21C of the housing 21, while the second stopper 42 is separated from the housing 21 and in contact with the rod stopper 33.

The outer diameters of the stoppers 41 and 42 may be arbitrarily changed, and may be larger or smaller than those of the illustrated embodiment. The outer diameter of the first stopper 41 is preferably set such that a force based on the hydraulic pressure of the second hydraulic chamber 23 to be applied to the resistance piston 40 becomes within a certain setting range. Also, each stopper 41, 42 may be in a shape other than a circular ring shape, such as a polygonal shape, or may include one or more radially projecting projections.

For the piston rod 30, the rod stopper 33 and the output portion 34 may be formed separately from the piston rod 30 in order to facilitate assembly of the resistance piston 40. In this case, after the resistance piston 40 is fitted to the piston rod 30, the rod stopper 33 and the output portion 34 are assembled on the piston rod 30.

Figure 2:
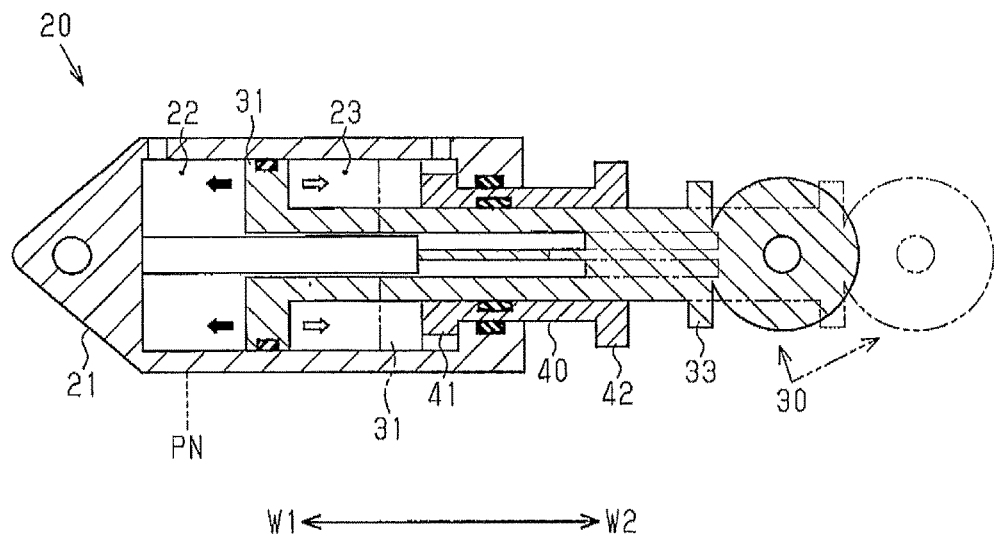
FIG. 2 is a sectional view of the hydraulic actuator in FIG. 1 when a spoiler is raised and lowered out of an overlapping region.
Figure 3:
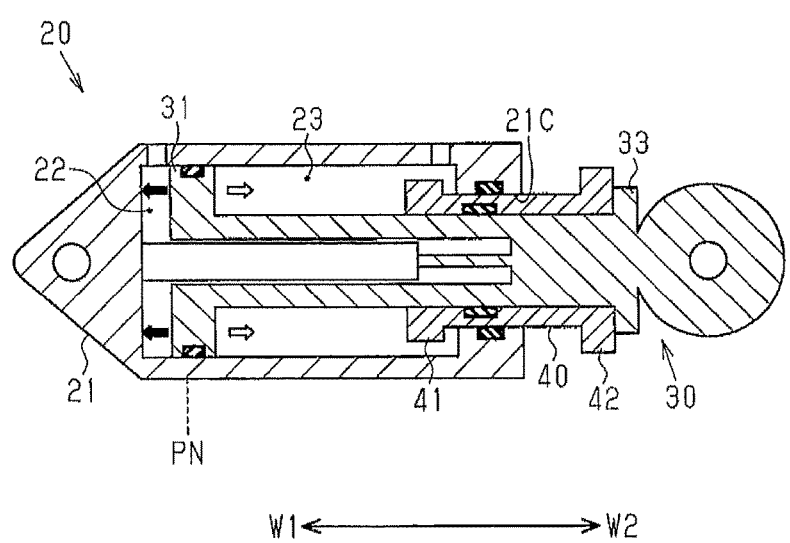
FIG. 3 is a sectional view of the hydraulic actuator in FIG. 1 when a spoiler is raised and lowered within an overlapping region.

Referring to FIG. 1 to FIG. 3, operations of the spoiler driving mechanism 1 will be described. In the following description, a "first moving direction W1" refers to a retracting direction of the piston rod 30, or a moving direction in which the piston rod 30 contracts the first hydraulic chamber 22 and expands the second hydraulic chamber 23. A "second moving direction W2" refers to a projecting direction of the piston rod 30, or a moving direction in which the piston rod 30 expands the first hydraulic chamber 22 and contracts the second hydraulic chamber 23.

As shown in FIG. 1, when the control valve 12 is located at the first communication position 12X and the hydraulic valve 13 is located at the communication position 13X in the spoiler driving mechanism 1, oil is supplied from the hydraulic oil source 10 to the first hydraulic chamber 22 of the hydraulic actuator 20, and oil in the second hydraulic chamber 23 is discharged to the reservoir 11. As a result, the piston rod 30 moves in the second moving direction W2, as shown by the white arrows in FIG. 2. The spoiler 104 accordingly moves upward. Then, as shown by the alternate long and two short dashed lines in FIG. 2, when the piston 31 contacts the first stopper 41 of the resistance piston 40, the movement in the second moving direction W2 of the piston rod 30 is restricted.

On the other hand, as shown in FIG. 1, when the control valve 12 is located at the second communication position 12Y and the hydraulic valve 13 is located at the communication position 13X in the spoiler driving mechanism 1, oil is supplied from the hydraulic oil source 10 to the second hydraulic chamber 23, and oil in the first hydraulic chamber 22 is discharged to the reservoir 11. As a result, the piston rod 30 moves in the first moving direction W1, as shown by the black arrows in FIG. 2. The spoiler 104 accordingly moves downward.

Figure 5:
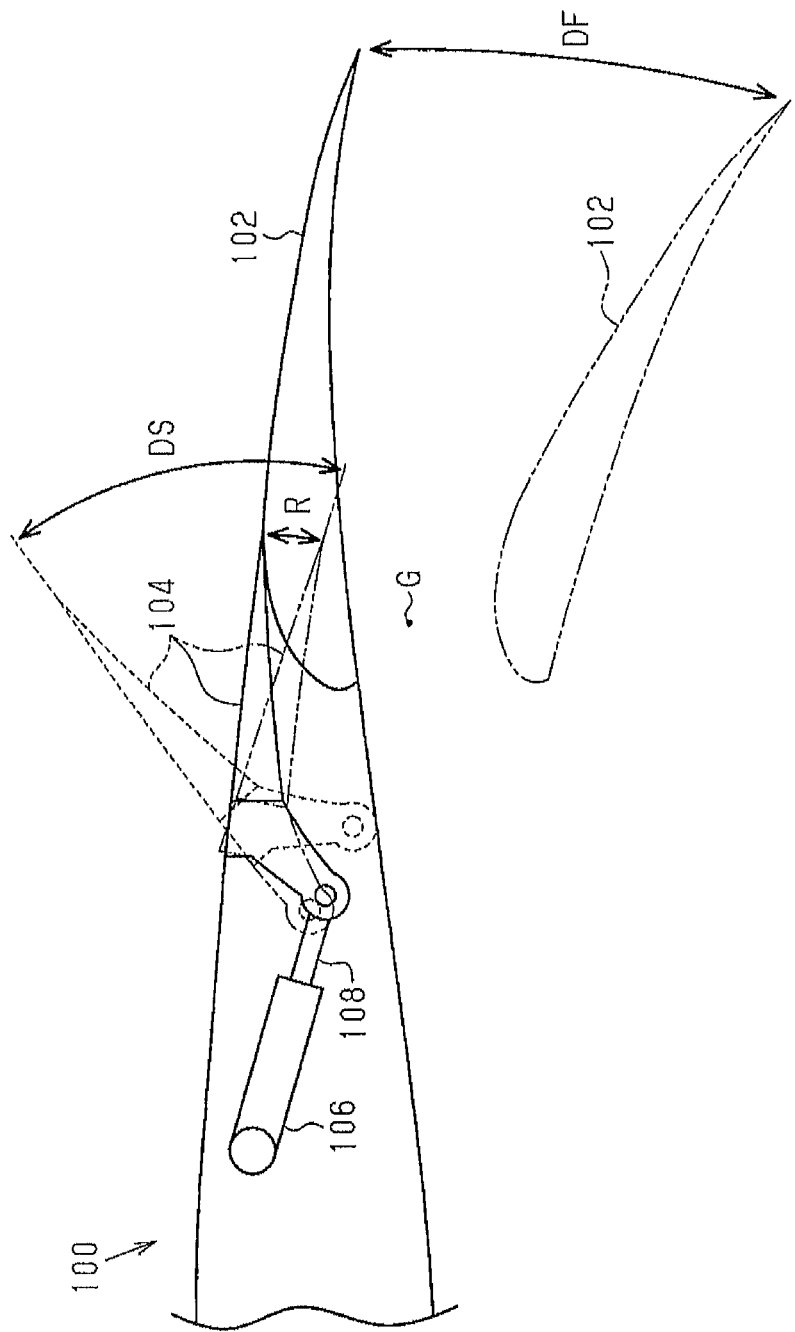
FIG. 5 is a schematic view for describing typical spoiler and flap operations.

Here, the driving range DS of the spoiler 104 according to a moving region of the piston rod 30 in which the first hydraulic chamber 22 contracts from where the piston rod 30 is at the neutral position PN corresponds to the overlapping region R of the spoiler 104 in FIG. 5. The spoiler driving mechanism 1 has a so-called droop function to permit the spoiler 104 being drivable within the overlapping region R.

As shown in FIG. 3, when the piston rod 30 moves in the first moving direction W1 from the neutral position PN, that is, when the spoiler 104 moves so as to occupy the gap G between the wing 100 and the flap 102 within the overlapping region R (refer to FIG. 5), the rod stopper 33 of the piston rod 30 presses the second stopper 42 in the first moving direction W1. This moves the resistance piston 40 in the first moving direction W1 integrally with the piston rod 30 against the hydraulic pressure of the second hydraulic chamber 23.

When the piston rod 30 moves in the second moving direction W2 to return the piston 31 to the neutral position PN, the resistance piston 40 moves in the second moving direction W2 with the movement of the piston rod 30. When the piston 31 reaches the neutral position PN, the first stopper 41 contacts the peripheral edge of the insertion hole 21C of the housing 21.

Operations of the hydraulic actuator 20 of the first embodiment will be described.

When the spoiler driving mechanism 1 stops, for example as a result of a loss of power, the control valve 12 and the hydraulic valve 13 are not supplied with electrical power. Therefore, the control valve 12 takes the second communication position 12Y and the hydraulic valve 13 takes the shut-off position 13Y. Accordingly, oil in the first hydraulic chamber 22 is likely to flow out and oil in the second hydraulic chamber 23 is unlikely to flow out, so that the spoiler 104 becomes a state in which the spoiler 104 is likely to fall and unlikely to rise. Moreover, when the spoiler 104 moves downward due to its own weight, the spoiler 104 may move within the overlapping region R.

On the other hand, when the piston rod 30 of the hydraulic actuator 20 moves in the first moving direction W1 further than the neutral position PN, the rod stopper 33 is in contact with the second stopper 42 of the resistance piston 40, and the resistance piston 40 serves as a resistance against a movement in the first moving direction W1 of the rod stopper 33. That is, in order to move the resistance piston 40 in the first moving direction W1, the rod stopper 33 needs to apply to the second stopper 42 a force greater than a force based on the hydraulic pressure of the second hydraulic chamber 23 to be applied to the first stopper 41 of the resistance piston 40. Therefore, a force to move in the first moving direction W1 of the piston rod 30 becomes less than a force to move in the first moving direction W1 of the piston rod 30 in a state before the rod stopper 33 contacts the second stopper 42. That is, a drive output (first drive output) of the hydraulic actuator 20 in the overlapping region R becomes less than a drive output (second drive output) of the hydraulic actuator 20 in a non-overlapping range of the driving range DS of the spoiler 104 other than the overlapping region R.

The hydraulic actuator 20 of the first embodiment has the advantages described below.

(1-1) The hydraulic actuator 20 includes, as an output suppressing structure, a structure in which the resistance piston 40 and the rod stopper 33 of the piston rod 30 contact in the overlapping region R. This reduces a force by which the spoiler 104 presses the flap 102 when the spoiler 104 contacts the flap 102 in the overlapping region R and suppresses the spoiler 104 from being excessively pressing down the flap 102. Moreover, the spoiler driving mechanism 1 does not require the release valve discussed in relation to FIG. 5. This suppresses an increase in size of the spoiler driving mechanism 1.

(1-2) The resistance piston 40 is pressed by a hydraulic pressure of the hydraulic actuator 20 to suppress a movement in the second moving direction W2 of the piston rod 30. This shortens the length of the oil passages, as compared with a comparative structure that assumes supplying a hydraulic pressure to press the resistance piston 40 from a hydraulic circuit outside of the hydraulic actuator 20. Thus, the output suppressing structure can be downsized.

Particularly, because the resistance piston 40 is pressed by the hydraulic pressure of the second hydraulic chamber 23 of the hydraulic actuator 20 to suppress a movement in the second moving direction W2 of the piston rod 30, a hydraulic circuit dedicated to the output suppressing structure no longer becomes necessary. Thus, the hydraulic actuator 20 can be downsized.

Figure 6:
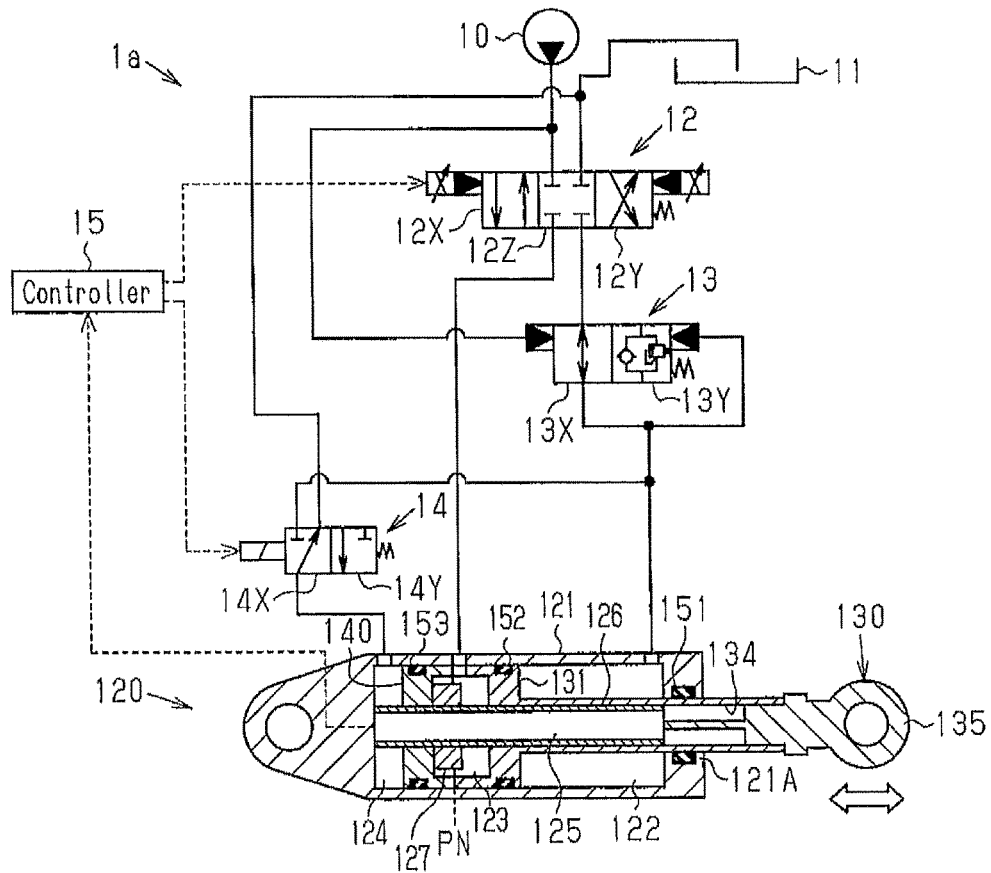
FIG. 6 is a configuration diagram of a spoiler driving mechanism including a hydraulic actuator of a second embodiment.

Referring to FIG. 6, a spoiler driving mechanism 1*a* according to a second embodiment will be described.

The spoiler driving mechanism 1*a* includes a hydraulic actuator 120 configured to drive a spoiler 104, a hydraulic oil source 10 configured to supply oil to the hydraulic actuator 120, and a reservoir 11 configured to reserve oil discharged from the hydraulic actuator 120. The hydraulic actuator 120, the hydraulic oil source 10, and the reservoir 11 are connected by oil passages. A control valve 12, a first hydraulic valve 13, and a second hydraulic valve 14 are arranged in the oil passages to control oil in the oil passages. The valves 12, 13 and 14 each are an example of a valve device. The spoiler driving mechanism 1*a* includes a controller 15 that controls operation of the hydraulic oil source 10, the control valve 12, and the second hydraulic valve 14.

A housing 121 of the hydraulic actuator 120 has a cylindrical bore and is supplied with oil. The cylindrical bore of the housing 121 is partitioned into a first hydraulic chamber 122, a second hydraulic chamber 123, and a third hydraulic chamber 124.

The control valve 12 is, for example, a solenoid valve, and connected to the hydraulic oil source 10, the reservoir 11, the first hydraulic valve 13, and the first hydraulic chamber 122. The control valve 12 is switchable to a first communication position 12X to supply oil to the second hydraulic chamber 123 and discharge oil from the first hydraulic chamber 122, a second communication position 12Y to discharge oil from the second hydraulic chamber 123 and supply oil to the first hydraulic chamber 122, and a shut-off position 12Z to shut off the supply and discharge of oil to and from the respective hydraulic chambers 122 and 123. The control valve 12 takes the second communication position 12Y when electrical power is not supplied to the control valve 12.

The first hydraulic valve 13 operates based on hydraulic pressure of the hydraulic oil source 10 and hydraulic pressure of the second hydraulic chamber 123, and is connected to the control valve 12 and the first hydraulic chamber 122. The first hydraulic valve 13 is switchable to a communication position 13X to communicate the first hydraulic chamber 122 with the control valve 12 and a shut-off position 13Y to shut off the communication between the first hydraulic chamber 122 and the control valve 12. The first hydraulic valve 13 has a relief function, at the shut-off position 13Y, of discharging oil to the control valve 12 when the first hydraulic chamber 122 reaches a hydraulic pressure of a predetermined value or more.

The second hydraulic valve 14 is, for example, a solenoid valve, and connected to the first hydraulic chamber 122, the third hydraulic chamber 124, and the reservoir 11. The second hydraulic valve 14 is switchable to a first valve position 14X to communicate the third hydraulic chamber 124 with the reservoir 11 and shut off communication between the first hydraulic chamber 122 and the third hydraulic chamber 124 and a second valve position 14Y to communicate the first hydraulic chamber 122 with the third hydraulic chamber 124 and shut off communication between the third hydraulic chamber 124 and the reservoir 11. The second hydraulic valve 14 takes the second valve position 14Y when electrical power is not supplied to the second hydraulic valve 14.

Figure 7:
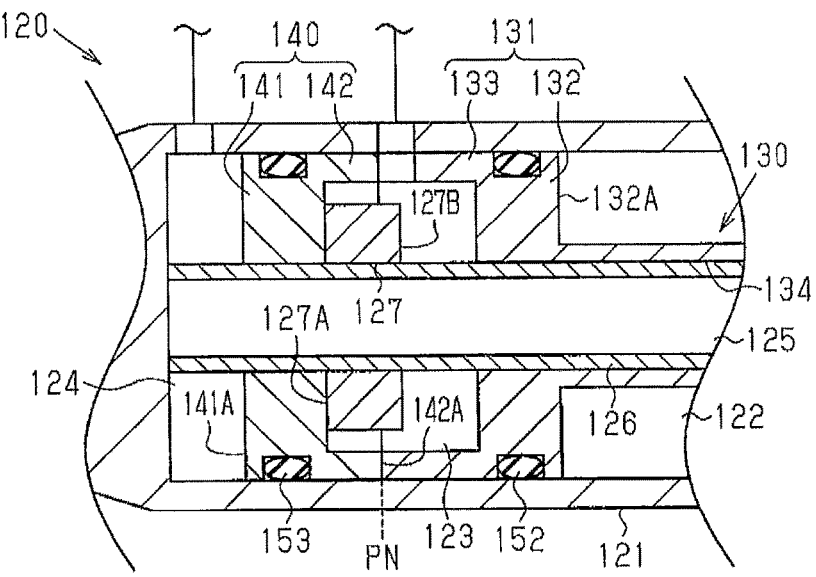
FIG. 7 is an enlarged view of a part of the hydraulic actuator of FIG. 6.

Referring to FIGS. 6 and 7, the hydraulic actuator 120 will be described in detail. FIGS. 6 and 7 show a state of the hydraulic actuator 120 in the case of a position of the spoiler 104 when an aircraft is cruising (hereinafter, a neutral position). The spoiler 104 at the neutral position is stowed in the wing 100.

As shown in FIG. 6, the housing 121 is formed in a circular cylindrical shape having an open end and a closed end in the longitudinal direction. A sealing member 151 such as an O-ring is attached to an inner peripheral part of an opening portion 121A of the housing 121. A piston rod 130, a position sensor 125 that detects a position of the piston rod 130, and a tubular cover or sleeve 126 surrounding the position sensor 125 are accommodated in the housing 121 and are coaxial with a central axis of the housing 121. An example of the position sensor 125 is a differential transformer type displacement sensor. The position sensor 125 transmits detected positional information of the piston rod 130 to the controller 15.

The piston rod 130 outwardly projects from the housing 121 via the opening portion 121A. The piston rod 130 includes a piston 131 that partitions between the first hydraulic chamber 122 and the second hydraulic chamber 123. The piston rod 130 includes a hollow portion 134 having a shape to accommodate a part of the position sensor 125.

As shown in FIG. 7, the piston 131 includes a circular ring plate-shaped base portion 132. A sealing member 152 such as an O-ring is attached to an outer peripheral part of the base portion 132. A radially outer part of the base portion 132 includes a circular cylindrical guide portion 133 extending to a side opposite to the first hydraulic chamber 122. As shown in FIG. 6, the piston rod 130 includes an output portion 35 projecting from the housing 121 and coupled to the spoiler 104 to drive the spoiler 104. The piston rod 130 of FIGS. 6 and 7 is composed of two members, but it may be composed of a single member. In the following description, the position of the piston 131 when the spoiler 104 is at the neutral position shown in FIGS. 6 and 7 may be referred to as a neutral position PN.

As shown in FIG. 7, the housing 121 accommodates a stopper piston 140 which is an example of a movement limiting structure that limits movement of the piston rod 130 to thereby limit the spoiler 104 from approaching the flap 102. The stopper piston 140 is arranged coaxially with the central axis of the housing 121 and partitions between the second hydraulic chamber 123 and the third hydraulic chamber 124.

The position sensor 125 and the sleeve 126 are inserted into the stopper piston 140. The stopper piston 140 includes a circular ring plate-shaped base portion 141. A sealing member 153 such as an O-ring is attached to an outer peripheral part of the base portion 141. The radially outer part of the base portion 141 includes a circular cylindrical guide portion 142 extending to a side opposite to the third hydraulic chamber 124.

In the illustrated embodiment, a radially outer part of the guide portion 142 is formed in a circular cylindrical shape. The radially outer part of the guide portion 142 may be formed in a polygonal shape as long as it is in contact with an inner circumferential surface of the housing 121 at a plurality of circumferential points. Even with such a stopper piston 140, communication between the second hydraulic chamber 123 and the third hydraulic chamber 124 is shut off by the sealing member 153 attached to the base portion 141 thereof.

As shown in FIG. 7, the base portion 141 includes an end surface 141A that receives hydraulic pressure of the third hydraulic chamber 124 in the stopper piston 140. The base portion 132 includes an end surface 132A that receives hydraulic pressure of the first hydraulic chamber 122 in the piston 131. The end surface 141A of the base portion 141 has an area larger than that of the end surface 132A of the base portion 132.

A circular cylindrical restricting portion 127 is fixedly attached to a radially outer part of the sleeve 126 to restrict the stopper piston 140 from moving to a side to which the third hydraulic chamber 124 expands. The restricting portion 127 has a central axis coaxial with that of the housing 121.

A radially outer part of the restricting portion 127 is not limited to a circular ring shape, and may be a polygonal shape. The central axis of the restricting portion 127 may be off-set with respect to the central axis of the housing 121. The restricting portion 127 may have an arbitrarily set axial thickness.

As shown in FIG. 7, the restricting portion 127 is in contact with a radially inner part of the base portion 141 of the stopper piston 140. In this state, a distal end surface 142A of the guide portion 142 of the stopper piston 140 is located between end surfaces 127A and 127B of the restricting portion 127. The end surfaces 127A and 127B of the restricting portion 127 may be referred to as a third hydraulic chamber side end surface and a second hydraulic chamber side end surface, respectively. The distal end surface 142A of the guide portion 142 may be, for example, by reducing the axial thickness of the restricting portion 27, located at a position the same as that of the end surface 127B of the restricting portion 127 in the axial direction of the housing 121 or at a second hydraulic chamber side further than the end surface 127B of the restricting portion 127.

Referring to FIGS. 6 and 8 to 11, operations of the spoiler driving mechanism 1a will be described. In the following description, a "first moving direction W1" refers to a retracting direction of the piston rod 130, or a moving direction of the piston rod 130 in which the first hydraulic chamber 122 expands and the second hydraulic chamber 123 contracts and a moving direction of the stopper piston 140 in which the third hydraulic chamber 124 contracts. A "second moving direction W2" refers to a projecting direction of the piston rod 130, or a moving direction of the piston rod 130 in which the first hydraulic chamber 122 contracts and the second hydraulic chamber 123 expands and a moving direction of the stopper piston 140 in which the third hydraulic chamber 124 expands. When the piston rod 130 moves in the first moving direction W1, the spoiler 104 falls, and when the piston rod 130 moves in the second moving direction W2, the spoiler 104 rises (see FIG. 5).

Figure 8:
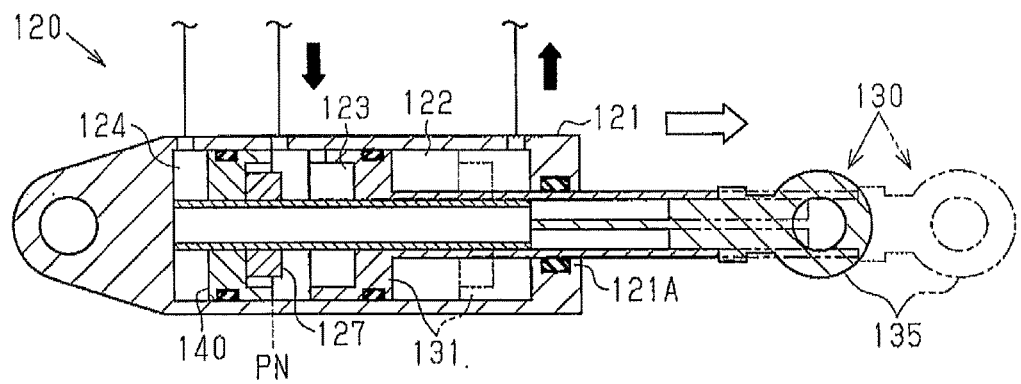
FIG. 8 is a sectional view of a hydraulic actuator when a spoiler rises.

The controller 15, when raising the spoiler 104, controls the control valve 12 to be located at the first communication position 12X and controls the second hydraulic valve 14 to be located at the first valve position 14X to start oil supply by the hydraulic oil source 10. Because the first hydraulic valve 13 accordingly takes the communication position 13X, oil is supplied from the hydraulic oil source 10 to the second hydraulic chamber 123, and oil in the first hydraulic chamber 122 is discharged to the reservoir 11. In accordance therewith, as shown in FIG. 8, the piston rod 130 moves in the second moving direction W2. As shown by the alternate long and two short dashed lines in FIG. 8, when the piston 131 then contacts the opening portion 121A of the housing 121, the movement in the second moving direction W2 of the piston rod 130 is limited.

Figure 9:
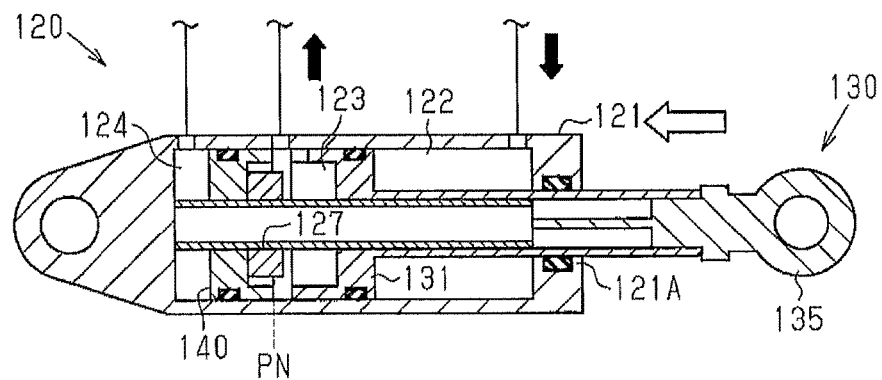
FIG. 9 is a sectional view of a hydraulic actuator when a spoiler falls.

The controller 15, when lowering the spoiler 104, controls the control valve 12 to be located at the second communication position 12Y and controls the second hydraulic valve 14 to be located at the first valve position 14X to start oil supply by the hydraulic oil source 10. Because the first hydraulic valve 13 accordingly takes the communication position 13X, oil is supplied from the hydraulic oil source 10 to the first hydraulic chamber 122, and oil in the second hydraulic chamber 123 is discharged to the reservoir 11. In accordance therewith, as shown in FIG. 9, the piston rod 130 moves in the first moving direction W1.

Figure 10:
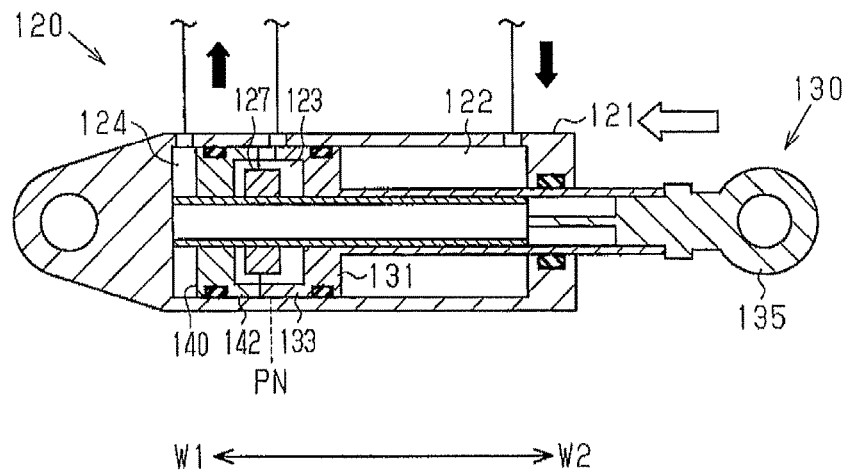
FIG. 10 is a sectional view of a hydraulic actuator when a spoiler is located in an overlapping region.
Figure 11:
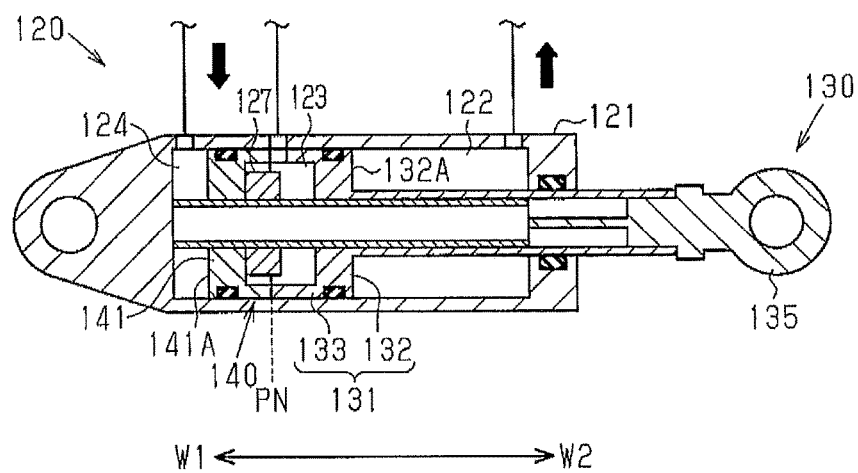
FIG. 11 is a sectional view of a hydraulic actuator when a power supply to a spoiler driving mechanism is shut off.

When further lowering the spoiler 104 from the neutral position in the overlapping region R so as to reduce the gap G between the wing 100 and the flap 102, that is, when the spoiler driving mechanism 1a activates a droop function, the controller 15 controls the control valve 12 to be located at the second communication position 12Y and controls the second hydraulic valve 14 to be located at the first valve position 14X. Accordingly, as shown in FIG. 10, the piston rod 130 and the stopper piston 140 integrally move in the first moving direction W1 as a result of the guide portion 133 of the piston 131 pressing the guide portion 142 of the stopper piston 140.

Operations of the second embodiment will be described.

When the spoiler driving mechanism 1a stops, for example as a result of a loss of power, the control valve 12 and the second hydraulic valve 14 are not supplied with electrical power. Also, because the hydraulic oil source 10 is not driven, the first hydraulic valve 13 is not supplied with oil. Therefore, the control valve 12 takes the second communication position 12Y, the first hydraulic valve 13 takes the shut-off position 13Y, and the second hydraulic valve 14 takes the second valve position 14Y. Accordingly, oil in the second hydraulic chamber 123 is likely to flow out because the second hydraulic chamber 123 communicates with the reservoir 11, and oil in the first hydraulic chamber 122 is unlikely to flow out because the first hydraulic chamber 122 communicates with the hydraulic oil source 10. Therefore, the spoiler 104 becomes a state in which the spoiler 104 is likely to fall and unlikely to rise. Therefore, the spoiler 104 may fall due to its own weight.

On the other hand, the first hydraulic chamber 122 and the third hydraulic chamber 124 communicate with each other, and the hydraulic pressure of the first hydraulic chamber 122 and the hydraulic pressure of the third hydraulic chamber 124 become almost equal to each other. Therefore, the piston rod 130 is supported by the stopper piston 140 even if the piston rod 130 attempts to move in the first moving direction W1 from the neutral position PN due to the own weight of the spoiler 104. For example, because the area of the end surface 141A of the base portion 141 of the stopper piston 140 is larger than that of the end surface 132A of the base portion 132 of the piston 131, a movement in the first moving direction W1 of the piston rod 130 is limited. Further, a force by which the spoiler 104 presses the piston rod 130 in the second moving direction W2 due to its own weight is sufficiently smaller than a difference of a force that the stopper piston 140 receives from the hydraulic pressure of the third hydraulic chamber 124 and a force that the piston 131 receives from the first hydraulic chamber 122. Therefore, the piston rod 130 does not move from the neutral position PN in the first moving direction W1.

When the spoiler driving mechanism 1a stops as a result of a loss of power with the piston rod 130 located at a first moving direction side further than the neutral position PN, the stopper piston 140 and the piston rod 130 integrally move in the second moving direction W2 as a result of the stopper piston 140 pressing the piston rod 130 in the second moving direction W2. When the stopper piston 140 then contacts the restricting portion 127, the movement in the second moving direction W2 of the stopper piston 140 and the piston rod 130 stops. Therefore, the piston rod 130 is located at the neutral position PN.

The hydraulic actuator 120 of the second embodiment has the advantages described below.

(2-1) The hydraulic actuator 120 includes, as a movement limiting structure, the stopper piston 140 that limits the piston rod 130 from moving in the first moving direction W1 with the first hydraulic chamber 122 and the third hydraulic chamber 124 communicating with each other as a result of the second hydraulic valve 14 taking the second valve position 14Y. Moreover, the area of the end surface 141A of the base portion 141 of the stopper piston 140 is larger than that of the end surface 132A of the base portion 132 of the piston 131 of the piston rod 130. Therefore, as described in the above-described actions, because a movement in the first moving direction W1 of the piston rod 130 is limited, the spoiler 104 does not enter the overlapping region R even if the spoiler driving mechanism 1a stops as a result of power being lost when the spoiler 104 is located in the driving range DS other than the overlapping region R, for example. Also, because the piston rod 130 is pressed by the stopper piston 140 such that the piston rod 130 takes the neutral position PN even if the spoiler driving mechanism 1a stops as a result of power being lost when the spoiler 104 is located in the overlapping region R, for example, the spoiler 104 is located in the driving range DS other than the overlapping region R. Thus, the spoiler 104 and the flap 102 no longer interfere with each other.

(2-2) The piston 131 presses the guide portion 142 being a radially outer part of the stopper piston 140. Therefore, as compared with a constitution in which a piston presses a radially inner part of a stopper piston, the stopper piston 140 is suppressed from tilting with respect to the housing 121 when the stopper piston 140 moves.

(2-3) The hydraulic actuator 120 includes the restricting portion 127 that contacts a radially inner part of the stopper piston 140. Therefore, because a constitution is provided in which the piston 131 presses a radially outer part of the stopper piston 140, a movement in the second moving direction W2 of the stopper piston 140 is limited, while the effect (2-2) can also be provided.

(2-4) The stopper piston 140 includes the guide portion 142. Therefore, even if the base portion 141 of the stopper piston 140 is reduced in axial thickness, the length of an outer peripheral surface of the stopper piston 140 that slides with respect to an inner peripheral surface of the housing 121 in the longitudinal direction of the housing 121 can be secured. Therefore, the housing 121 can be reduced in longitudinal length, and also, the stopper piston 140 is suppressed from tilting with respect to the housing 121 when the stopper piston 140 moves.

It should be apparent to those skilled in the art that the present invention may be embodied in many other specific forms without departing from the scope of the invention. Particularly, it should be understood that the present invention may be embodied in the following forms.

The combination of the piston 31 and the piston rod 30 of the first embodiment and the combination of the piston 131 and the piston rod 130 of the second embodiment are examples of a first piston member. The 40 of the first embodiment and the 140 of the second embodiment are examples of a second piston member.

The output suppressing structure of the first embodiment may be an elastic member or air spring arranged between the housing 21 and the rod stopper 33 of the piston rod 30. The elastic member is, for example, a coil spring.

The output suppressing structure of the first embodiment may be a shock absorber, or a hydraulic cylinder arranged between the housing 21 and the rod stopper 33 of the piston rod 30. A rod fixed to a piston of the shock absorber is connected to the rod stopper 33.

The output suppressing structure of the first embodiment may be a friction structure for increasing friction between an inner peripheral surface to construct the insertion hole 21C near the rod stopper 33 of the piston rod 30 and an outer surface of the piston rod 30. The friction structure can be, for example, a rubber sheet wound around the piston rod 30.

The output suppressing structure of the first embodiment may include a first magnet attached to the rod stopper 33 of the piston rod 30 and a second magnet attached to a position opposing the rod stopper 33 in the housing 21. Opposite faces of the first magnet and the second magnet have the same magnetic polarity.

The output suppressing structure of the first embodiment may be a friction structure that makes a frictional force with the piston 31 of a part at a first moving direction W1 side further than the neutral position PN in the housing 21 larger than a frictional force with the piston 31 of a part at a second moving direction W2 side further than the neutral position PN in the housing 21. The friction structure may include a rubber sheet attached to a first moving direction-side part further than the neutral position PN in the housing 21.

The output suppressing structure of the first embodiment may be an elastic member arranged inside the first hydraulic chamber 22. The elastic member is, for example, a coil spring. The coil spring is arranged coaxially with the piston rod 30, and is fixed to an end portion at the first moving direction W1 side of the housing 21. When the piston rod 30 takes the neutral position PN, the piston 31 and the coil spring contact, and when the piston rod 30 moves in the second moving direction W2 further than the neutral position PN, the piston 31 separates from the coil spring. When the piston rod 30 moves in the first moving direction W1 from the neutral position PN, the piston 31 compresses the coil spring.

Figure 4:
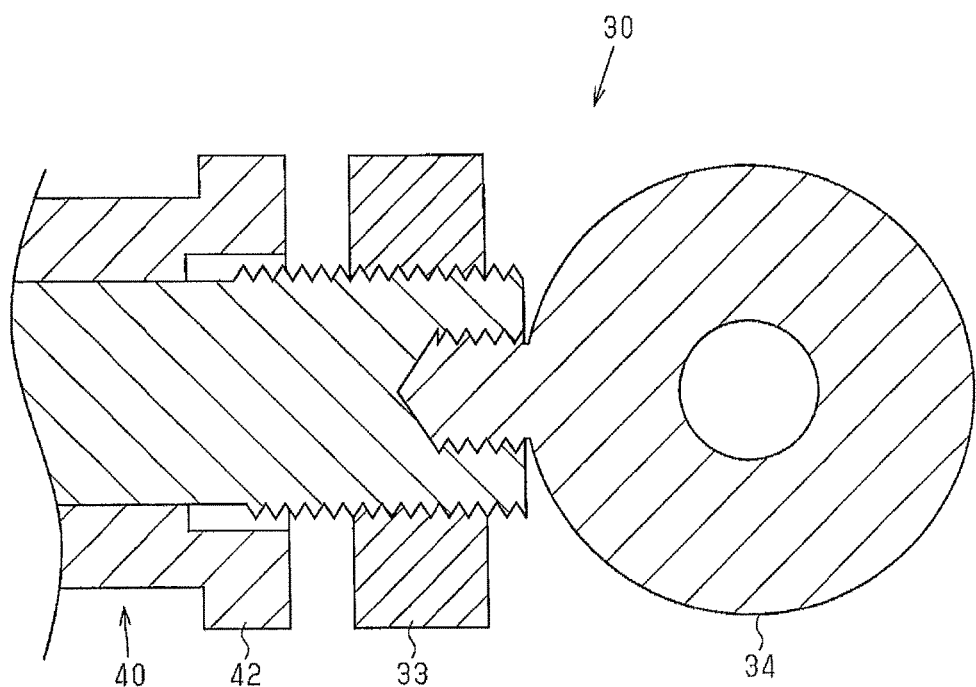
FIG. 4 is a sectional view showing a distal end portion of a piston rod of a hydraulic actuator of a modification, in an enlarged manner.

The piston rod 30 and the rod stopper 33 of the first embodiment are formed as a single member, but the piston rod 30 and the rod stopper 33 may be formed separately from each other (refer to FIG. 4). In this case, the rod stopper 33 is screwed into the piston rod 30. The rod stopper 33 can thereby be adjusted in position with respect to the piston rod 30. Therefore, the neutral position PN of the piston 31 of the piston rod 30 can be adjusted. There may be a structure of likewise separately forming the first stopper 41 of the resistance piston 40 and adjusting the neutral position PN of the piston 31 by screwing the first stopper 41 into the resistance piston 40.

In the second embodiment, there is a constitution of the restricting portion 127 attached to the sleeve 126, but, there may be provided a constitution of a restricting portion by changing the sleeve 126 in shape or by changing the housing 121 in shape.

Figure 12:
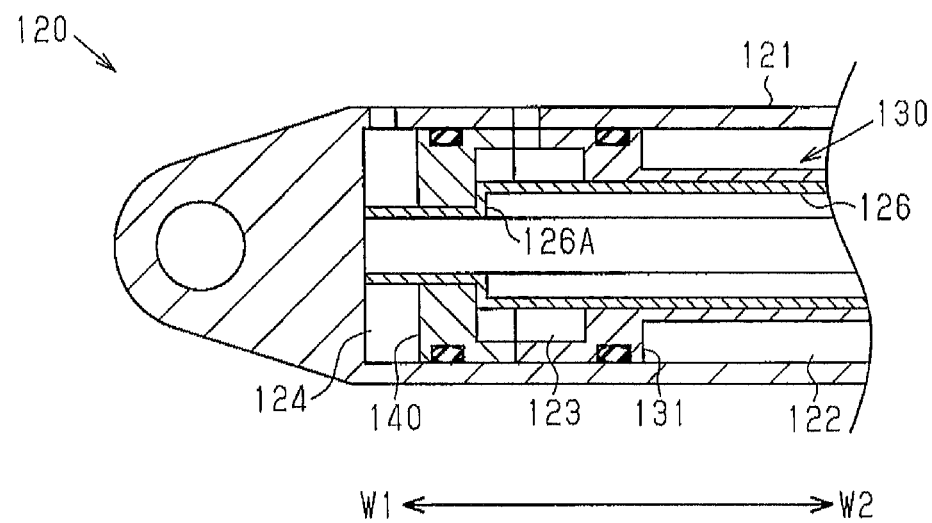
FIG. 12 is an enlarged view of a part of a hydraulic actuator of a modification.

For example, as shown in FIG. 12, a step portion 126A to serve as a restricting portion is formed in the sleeve 126. A part at a first moving direction side further than the step portion 126A in the sleeve 126 accordingly has an outer diameter smaller than that of a part at a second moving direction side further than the step portion 126A in the sleeve 126. The stopper piston 140 is limited from moving in the second moving direction W2 by contacting the step portion 126A.

Figure 13:
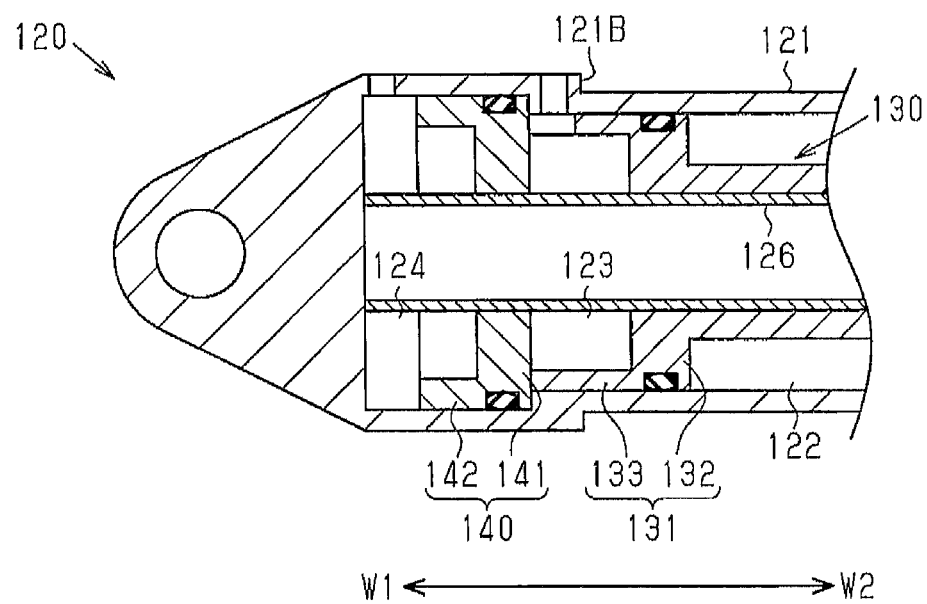
FIG. 13 is an enlarged view of a part of a hydraulic actuator of a modification.

Also, for example, as shown in FIG. 13, a step portion 21B to serve as a restricting portion is formed in the housing 121. A part at a first moving direction side further than the step portion 21B in the housing 121 accordingly has an inner diameter larger than that of a part at a second moving direction side further than the step portion 21B in the housing 121. Also, the guide portion 142 of the stopper piston 140 extends from a radially outer part of the base portion 141 toward the first moving direction W1. Therefore, the guide portion 133 of the piston 131 contacts the base portion 141 of the stopper piston 140.

In addition, the guide portion 142 may extend in the second moving direction W2 from a radially inner part of the base portion 141. According to this constitution, because the guide portion 133 of the piston 131 and the guide portion 142 of the stopper piston 140 overlap in a radial direction of the housing 121, the housing 121 can be reduced in longitudinal dimension.

In the second embodiment, the restricting portion 127 limits a movement in the second moving direction W2 of the stopper piston 140 by contacting a radially inner part of the base portion 141 of the stopper piston 140, but the restricting portion 127 may contact a radially outer part of the base portion 141. The restricting portion 127 is fixed to, for example, the inner peripheral surface of the housing 121. In the case of such a restricting portion 127, the guide portion 142 of the stopper piston 140 extends in the second moving direction W2 from a radially inner part of the base portion 141. In addition, the guide portion 133 of the piston 131 of the piston rod 130 extends in the first moving direction W1 from a radially inner part of the base portion 132.

In the second embodiment, the guide portion 142 of the stopper piston 140 extends from the base portion 141 toward the piston 131, but the stopper piston 140 is not limited to this shape. For example, the guide portion 142 may extend in an opposite direction to the piston 131 from the base portion 141. In this case, the guide portion 133 of the piston 131 contacts a radially outer part of the base portion 141. Also, for example, the guide portion 142 may extend in both directions of a direction from the base portion 141 toward the piston 131 and an opposite direction to the piston 131. Also, for example, the guide portion 142 may be omitted from the stopper piston 140.

In the second embodiment, as a movement limiting structure, a relationship has been provided in which the area of the end surface 141A of the base portion 141 of the stopper piston 140 is larger than that of the end surface 132A of the base portion 132 of the piston 131, but the movement limiting structure is not limited to this constitution. For example, as a movement limiting structure, a pressure increasing valve may be provided in an oil passage connecting the first hydraulic chamber 122 and the third hydraulic chamber 124 such that the hydraulic pressure of the third hydraulic chamber 124 becomes greater than that of the first hydraulic chamber 122. The piston rod 130 is thereby prevented from moving in the first moving direction W1 from the neutral position PN even if the area of the end surface 141A of the base portion 141 of the stopper piston 140 is equal to or less than that of the end surface 132A of the base portion 132 of the piston 131.

The present disclosure includes the followings.
[Clause 1] A hydraulic actuator (20) adapted to drive a spoiler (104) of a wing (100) having a flap (102), the spoiler (104) being movable in a spoiler driving range (DS), the flap (102) being movable in a flap driving range (DF), and the spoiler driving range (DS) including an overlapping region (R) where the spoiler driving range (DS) and the flap driving range (DF) overlap, the hydraulic actuator (20) comprising:

a housing (21) having a cylindrical bore;
a piston (31) accommodated in the housing and directly or indirectly coupled to the spoiler to output a first drive output when the piston is positioned at a first axial position in the cylindrical bore of the housing corresponding to the overlapping region (R) of the spoiler and output a second drive output when the piston is positioned at a second axial position in the cylindrical bore of the housing corresponding to a non-overlapping region of the spoiler other than the overlapping region (R); and
a tubular resistance piston (40) coupled to and axially movable relative to the housing and the piston to suppress the first drive output corresponding to the overlapping region (R) of the spoiler to be less than the second drive output corresponding to the non-overlapping region of the spoiler, wherein the tubular resistance piston (40) includes an axially inner portion arranged in the housing and an axially outer portion arranged outside the housing.

The above description is intended to be illustrative, and not restrictive. For example, the above-described examples (or one or more aspects thereof) may be used in combination with each other. For example, components of the first embodiments may be combined with components of the second embodiment. Other embodiments can be used, such as by one of ordinary skill in the art upon reviewing the above description. Also, in the above detailed description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the detailed description, with each claim standing on its own as a separate embodiment. The scope of the invention should be determined with reference to the appended claims, along with the full scope of equivalents to which such claims are entitled.

The invention claimed is:
1. A hydraulic actuator adapted to drive a spoiler of a wing having a flap, the hydraulic actuator comprising:
a housing; and
a suppressor movable with respect to the housing and configured to, when the hydraulic actuator drives the spoiler in an overlapping region where a driving range of the flap and a driving range of the spoiler overlap, suppress a first drive output which is a drive output of the hydraulic actuator in the overlapping region to be less than a second drive output which is a drive output of the hydraulic actuator in a non-overlapping region other than the overlapping region.

2. The hydraulic actuator according to claim 1, wherein the suppressor is configured to utilize hydraulic pressure to suppress the first drive output to be less than the second drive output.

3. The hydraulic actuator according to claim 2, further comprising a piston rod directly or indirectly coupled to the spoiler, wherein the suppressor is configured to utilize a hydraulic pressure that drives the piston rod to suppress the first drive output to be less than the second drive output.

4. The hydraulic actuator according to claim 3, wherein the piston rod includes a piston configured to partition a first hydraulic chamber and a second hydraulic chamber, and the suppressor includes a resistance piston that is arranged in the second hydraulic chamber and is movable with respect to the piston rod, and a stopper that contacts the resistance piston to restrict movement of the piston rod when the piston rod moves so as to contract the first hydraulic chamber in the overlapping region.

5. The hydraulic actuator according to claim 4, wherein the resistance piston and the stopper are adjustable in relative position there between.

6. A hydraulic actuator adapted to drive a spoiler of an aircraft wing having a flap, the spoiler being movable in a spoiler driving range, the flap being movable in a flap driving range, and the spoiler driving range including an overlapping region where the spoiler driving range and the flap driving range overlap, the spoiler taking a neutral position when the aircraft cruises, the hydraulic actuator comprising:
   a piston rod configured to transmit a drive output of the hydraulic actuator to the spoiler; and
   a movement limiter configured to limit a movement of the piston rod in a direction in which the spoiler approaches the flap when the spoiler is located in the overlapping region and when the spoiler takes the neutral position.

7. The hydraulic actuator according to claim 6, further comprising a housing and a piston of the piston rod accommodated in the housing, wherein the piston partitions the housing into a first hydraulic chamber that produces a hydraulic pressure for lowering the spoiler and a second hydraulic chamber that produces a hydraulic pressure for raising the spoiler,
   wherein the movement limiter includes a stopper piston that is arranged in the housing and partitions between the second hydraulic chamber and a third hydraulic chamber in the housing, and limits movement of the piston rod based on a relationship of a force that the stopper piston receives from hydraulic pressure of the third hydraulic chamber when the first hydraulic chamber and the third hydraulic chamber communicate with each other via a valve device and a force that the piston receives from hydraulic pressure of the first hydraulic chamber, and
   wherein the stopper piston has an area receiving hydraulic pressure of the third hydraulic chamber that is larger than an area of the piston receiving hydraulic pressure of the first hydraulic chamber.

8. The hydraulic actuator according to claim 7, wherein the piston is configured to contact a radially outer part of the stopper piston when the piston moves in a moving direction of the piston.

9. The hydraulic actuator according to claim 7, further comprising a restricting portion configured to contact a radially inner part of the stopper piston other than a radially outer part of the stopper piston when the stopper piston moves in a moving direction of the stopper piston to restrict a movement of the stopper piston in a direction in which the stopper piston expands the third hydraulic chamber.

10. The hydraulic actuator according to claim 7, further comprising a restricting portion configured to restrict a movement of the stopper piston in a direction in which the stopper piston expands the third hydraulic chamber, wherein the stopper piston includes a tabular base portion configured to contact with the restricting portion and a guide portion extending from the base portion in a moving direction of the stopper piston to guide a movement of the stopper piston in the moving direction of the stopper piston, and a distal end surface of the guide portion is located at a second hydraulic chamber side further than an end surface of the restricting portion facing toward the third hydraulic chamber when the base portion contacts the restricting portion.

11. The hydraulic actuator according to claim 10, wherein the restricting portion includes a second hydraulic chamber side surface and a third hydraulic chamber side surface, and the distal end surface of the guide portion is located between the second hydraulic chamber side surface and the third hydraulic chamber side surface of the restricting portion when the base portion contacts the restricting portion.

12. A hydraulic actuator adapted to drive a spoiler of a wing having a flap, the spoiler being movable in a spoiler driving range, the flap being movable in a flap driving range, and the spoiler driving range including an overlapping region where the spoiler driving range and the flap driving range overlap, the hydraulic actuator comprising:
   a housing having a housing bore;
   a first piston member coupled to the spoiler and axially movable in the housing bore to drive the spoiler; and
   a second piston member coupled to the housing and the first piston member, wherein the second piston member is configured to interact with the first piston to prevent the flap from interfering with or pressing down the flap when the spoiler droops down in the overlapping region.

13. The hydraulic actuator according to claim 12, wherein the first piston member is configured to press the second piston member and move the second piston member together with the first piston member relative to the housing when the spoiler is in the overlapping region.

14. The hydraulic actuator according to claim 13, wherein the second piston member is configured to generate resistance when the spoiler is in the overlapping region.

15. The hydraulic actuator according to claim 12, wherein the first piston member includes a piston rod outwardly projecting from the housing through an insertion hole of the housing, and the second piston member includes an outer portion outwardly projecting from the housing through the insertion hole of the housing.

16. The hydraulic actuator according to claim 15, wherein the second piston member is a cylindrical tubular member including a center through hole and opposite end portions, wherein one of the end portions is an inner portion including a first stopper positioned in the housing bore and the other one of the end portions is the outer portion including a second stopper positioned outside the housing bore, wherein the first stopper is configured to be sandwiched between an inner end surface of the housing bore and the first piston member when the hydraulic actuator fully droops down the spoiler.

17. The hydraulic actuator according to claim 12, wherein the second piston member is entirely accommodated in the housing bore.

18. The hydraulic actuator according to claim 17, wherein the second piston member is a cylindrical tubular member including a center through hole and opposite end portions, wherein one of the end portions faces toward an inner end surface of the housing bore to define a hydraulic chamber there between, and the other one of the end portions is configured to contact the first piston member in the housing bore as long as the spoiler is in the overlapping region.

* * * * *